United States Patent [19]
Knapp

[11] Patent Number: 6,019,132
[45] Date of Patent: Feb. 1, 2000

[54] PLUG WITH ANCHORED RETAINING PACKINGS FOR A CARTRIDGE FOR A WATER FAUCET

[75] Inventor: Francesco Knapp, Cava Manara, Italy

[73] Assignee: Masco Corporation of Indiana, Indianapolis, Ind.

[21] Appl. No.: 09/077,228
[22] PCT Filed: Sep. 24, 1997
[86] PCT No.: PCT/US97/16832
  § 371 Date: Dec. 21, 1998
  § 102(e) Date: Dec. 21, 1998
[87] PCT Pub. No.: WO98/14728
  PCT Pub. Date: Apr. 9, 1998

[30] Foreign Application Priority Data

Oct. 1, 1996 [IT] Italy .................................. TO96A0802

[51] Int. Cl.[7] .................................................. F16K 31/06
[52] U.S. Cl. .................................. 137/625.17; 137/625.4; 251/174
[58] Field of Search ........................... 137/625.17, 625.4, 137/454.6; 251/174, 176

[56] References Cited

U.S. PATENT DOCUMENTS

| | | | |
|---|---|---|---|
| 4,856,556 | 8/1989 | Mennigmann | 137/625.4 |
| 4,921,016 | 5/1990 | Gnauert et al. | 137/625.17 |
| 4,941,509 | 7/1990 | Orlandi | 137/625.17 |
| 5,111,842 | 5/1992 | Knapp | 137/454.6 |
| 5,303,736 | 4/1994 | Orlandi | 137/625.4 |

*Primary Examiner*—John Rivell
*Attorney, Agent, or Firm*—Myron B. Kapustij; Lloyd D. Doigan

[57] ABSTRACT

A plug with retaining packing for a water faucet cartridge where the packing is made in one piece on both sides of the plug. Both the portion of the packing that is on one side of the plug and the portion of the packing that is on the other side of the plug have a part of their surface in contact with and resting on the plug with respect to the axial direction of the plug and being connected to each other by at least one connection portion that extends substantially in an axial direction in a peripherally continuous manner or by sections through appropriate openings in the plug. The packing is formed and shaped on the plug by injecting an elastomer in the liquid state and cross-linking the elastomer.

16 Claims, 9 Drawing Sheets

PLUG WITH ANCHORED RETAINING PACKINGS FOR A CARTRIDGE FOR A WATER FAUCET

FIELD OF THE INVENTION

This invention relates to a plug with retaining and sealing packing for a water faucet cartridge.

BACKGROUND OF THE INVENTION

A water faucet cartridge contains operating parts including means for the control of water flow and handling members and is intended to be inserted in a removable and leak-proof fashion in the cavity of a water faucet body connected to pipes. A cartridge permits easy and rapid replacement of operating parts when they have broken or when they have become worn out. The cartridge has a packing which, when the cartridge is inserted into the body of the faucet, establishes a sealing hold with respect to the bottom of the cavity of the faucet body. The plug also establishes a sealing hold with respect to an internal member that is a part of the means which control the water flow such as, for example, a fixed plate made of hard material which cooperates with a mobile plate that is operated by the handling members.

These seals have been conventionally established by packings which extend through the plug and press against the bottom of the cavity of the faucet body against the fixed plate (a known and conventional arrangement shown schematically in FIG. 1 of the drawings). This arrangement had the disadvantage that the contact pressure of the packing was the same against the bottom of the cavity of the faucet body and against the fixed plate. This meant that in many cases an excessive mounting compression had to be applied to the fixed plate, said excessive compression obstructing the operation of the faucet.

This is why the use of two separate packings installed on both sides of the plug was resorted to. One packing acts against the bottom of the faucet body, while the other packing acts against the fixed plate. This makes it possible to apply different compressions to the two packings (a known and conventional arrangement illustrated schematically in FIG. 2 of the drawings). However, it is easy to see that similar packings lodged in appropriate seats of the plug can be deformed or can be expelled from their seats under high pressures or pressure surges such as arise when the faucet is in operation. To prevent this disadvantage elastomers that are relatively rigid are used for packings, and relatively high mounting compressions are used on the packings. Both of these factors impede the performance of the faucet. Provision for special configurations of the seats that receive the packings can be made but these are expensive and are not always effective.

Another serious problem associated with these packings can be observed when a cartridge is assembled by means of automatic equipment, as is now customary. The grasp and insertion of the packings in their seats call for appropriate work stations and constitute an operation that is very delicate due to the deformability of the packings and the rather poor precision of their dimensions. Because of this packings rather frequently are improperly installed. This results in the equipment coming to a halt and manual action being required to remove the defective cartridges. Furthermore, the packings that are intended for the outside of the plug must be inserted manually after the completion of the cartridge, otherwise they would become detached during the assembly operations. These outside packings are also frequently separated from the finished cartridge during transport.

One object of this invention is to provide a plug with retaining packings for a faucet cartridge which, in addition to permitting the application of different assembly compressions on the two sides of the plug, also ensures that the packings cannot be deformed or expelled from their seats even under maximum pressures or foreseeable pressure surges, and to substantially facilitate the mounting of the cartridge by automatic equipment.

SUMMARY OF THE INVENTION

According to the present invention, the packing is made in one piece on both sides of the plug. The portion of the packing that is on one side of the plug and the portion of the packing that is on the other side of the plug have a portion of their surfaces resting against the plug with respect to the axial direction of the plug and linked to each other by at least one connecting portion that extends primarily in the axial direction. The packing is molded on the plug by injecting an elastomer in the liquid state and then cross-linking it.

Due to these features both portions (upper and lower) of the packing are able to accept the necessary assembly compression from the plug against which a part of their surface rests. Thus, the possibility of applying adequate, possibly different compressions upon the portions of packings installed on the two sides of the plug is assured. At the same time, the packing is positively anchored at the bottom of the cartridge and the link between the two portions of the packing that are on the two sides of the plug ensures that the portions themselves cannot be deformed or expelled from their seats even when subjected to high stresses which are within the breaking strength of the material of which the packings are made.

In many cases the packings can be made of an elastomer having high yield characteristics, which is an advantage to the faucet's proper performance.

Making these packings by an injection procedure makes it possible to obtain the desired configurations, which in many cases could not be achieved in any other way and which would otherwise involve complex operations. It is possible to provide packings with certain configurations that could not have heretofore been achieved in a convenient fashion or that would have made the packings themselves excessively delicate. In particular, it is possible to provide the packing shapes that exhibit differences in extension in various directions, and shapes that are considerably different on the two sides of the plug. It is also possible to provide packings that are so resistant that they are not limited to operating only statically with operationally immobile parts, but can function properly with an operationally mobile part such as a stopper. This makes it possible to produce cartridges with a simpler and more economical structure.

The fact that the packings are made on the plug itself avoids any and all operations requiring the assembly of the packings and thus simplifies mounting of the cartridges. In particular in automated assembly the number of work stations can be reduced and the most frequent causes of equipment stoppage can be prevented.

DESCRIPTION OF THE PREFERRED EMBODIMENTS

Figure 1:
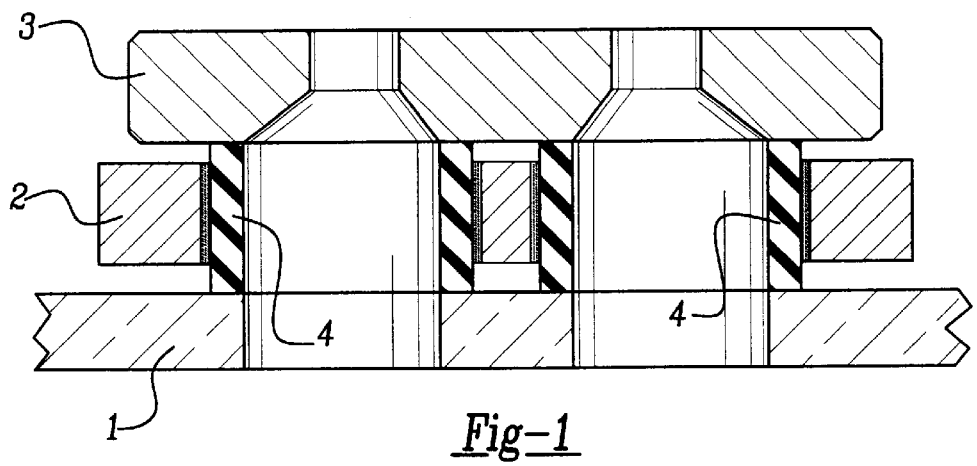
FIG. 1 is a cross-sectional view of a prior art shape of a plug with packing.
Figure 2:
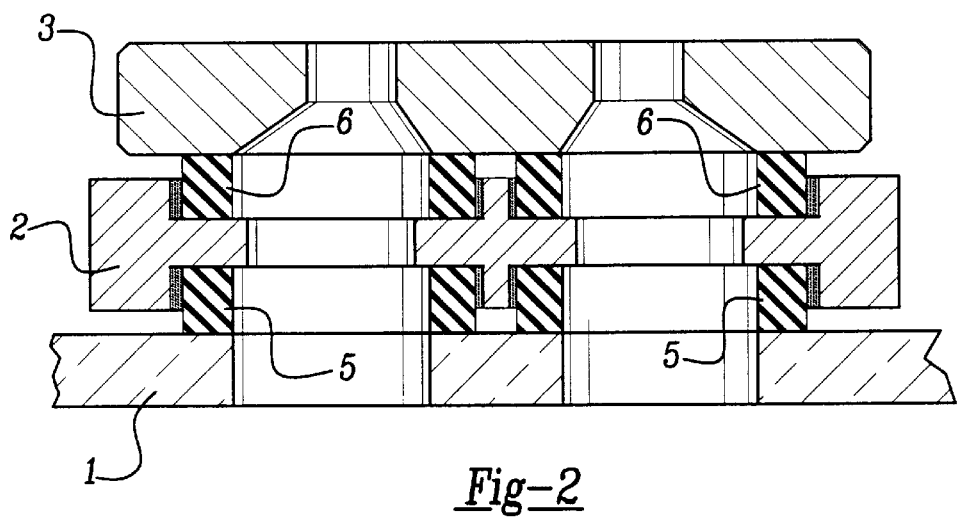
FIG. 2 is a cross-sectional view of another prior art shape of a plug with packing.

FIGS. 1 and 2 show a plug with prior art packings. Here and in the successive figures the reference numeral 1 indicates the bottom of a faucet body cavity containing passages for water. The remaining parts of the faucet body are not shown, because they are of no relevance to this invention. In the figures the reference numeral 2 refers to the bottom of a cartridge and the reference numeral 3 refers to a fixed distribution plate made of hard material constituting a part of the flow control means in the cartridge. The other parts of the cartridge are omitted in FIGS. 1 to 15 because they are of no concern to this invention.

As shown in FIG. 1, prior art packings 4 are inserted through openings in plug 2 to connect corresponding passages in the bottom 1 of the faucet cavity and in fixed plate 3 providing a seal between both of these parts. In this case it is not possible to apply different assembly compressions between packings 4 and bottom 1, and between packings 4 and fixed plate 3, as is often required.

In the prior art packing shown in FIG. 2 the above discussed disadvantage is eliminated by employing separate packings 5 and 6 that provide a seal between plug 2 and bottom 1 of the faucet cavity and between plug 2 and fixed plate 3. It is thus possible to apply different mounting compressions on packings 5 and 6. However, packings 5 and 6 are retained in their seats only by the respective mounting compressions, and in the presence of high working pressures and pressure surges they can be deformed in the spaces existing between plug 2 and bottom 1 of the faucet body cavity and between plug 2 and fixed plate 3, or they can be ejected from their seats through said spaces. To prevent this problem it has been proposed that seats that receive the packings have particular configurations. However, this is not reliable and not always sufficient. Furthermore, serious problems exist in the assembly of the cartridges because of the need for inserting packings in the seats of the plug.

Figure 3:
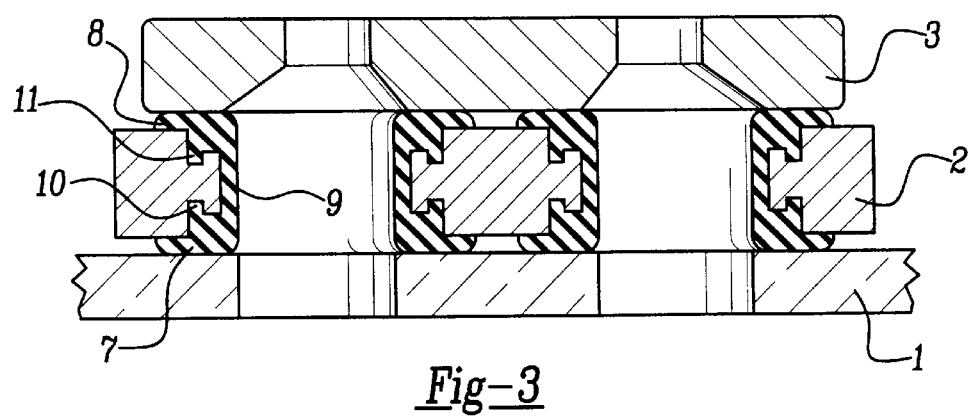
FIG. 3 is a side elevational cross-sectional view of a packing of the instant invention mounted on a plug.

FIG. 3 shows one embodiment of a plug with the packings anchored in accordance with the present invention. In this case in each passage opening in plug 2 of the cartridge there is installed a sealing packing that has an inferior portion 7 and a superior portion 8. Both portions are linked by a portion 9 that extends axially through the opening of plug 2. Preferably the inferior portion 7 and the superior portion 8 have projections 10 and 11 that are disposed in corresponding cavities of plug 2.

Both the inferior portion 7 and the superior portion 8 of each packing have a large portion of their surface abutting against plug 2 of the cartridge. Because of this these portions receive adequate compression between plug 2 and bottom 1 of the faucet body cavity for portion 7 and between plug 2 and fixed plate 3 for portion 8. This is why the mounting compressions applied to portions 7 and 8 of the packing can be different. Thus, regardless of what the pressure or the pressure surge applied to the packing and acting inside said packing toward the outside may be, neither portion 7 nor portion 8 of the packing is deformed to the outside nor ejected from its seat because it is positively retained in its seat by the link through portion 9 with the other portion 8 or 7. When projections 10 and 11 are inserted in corresponding cavities in the plug they also collaborate in this positive retaining action. Projections 10 and 11, when present, can be continuous, they can be ring-shaped, or they can exist only in sections.

As can be seen from FIG. 3 it would be very difficult to apply to plug 2 a separate packing 7–11 having this shape and this application could not be accomplished by automatic equipment. The production of this packing is easy and industrially convenient by proceeding in accordance with the instant invention and molding it directly on plug 2 by injecting an elastomer in the liquid state into a suitable mold and cross-linking the elastomer. This procedure eliminates any packing mounting operation. By proceeding in this way the shape of the packing can be selected as desired even though it may be complex.

Figure 4:
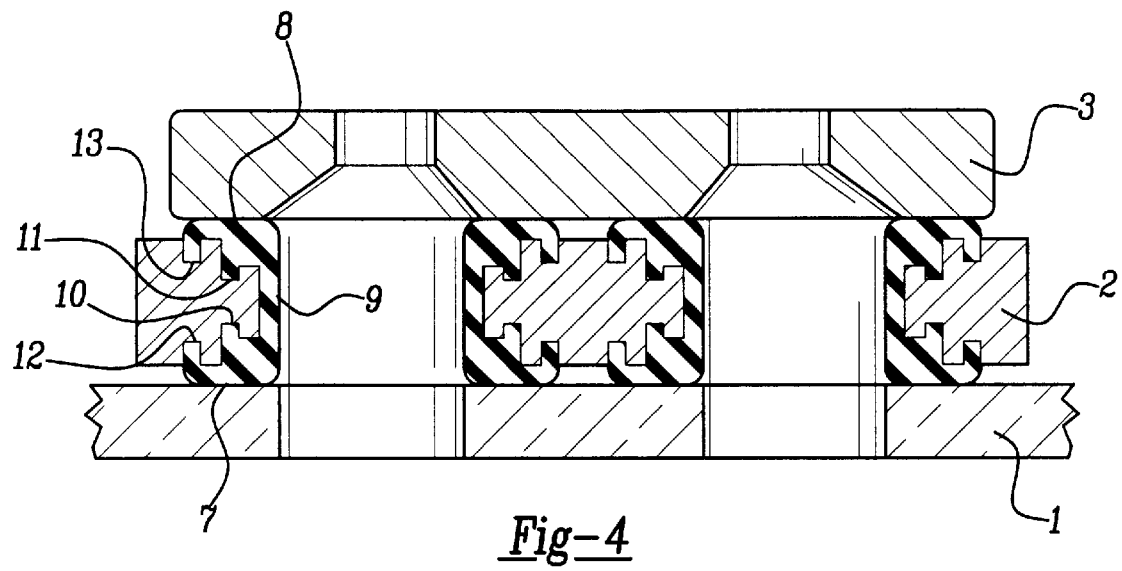
FIG. 4 is a view similar to FIG. 3 except showing a second embodiment of a packing of the instant invention.

The embodiment illustrated in FIG. 4 is extremely similar to the embodiment illustrated in FIG. 3 from which it differs only by the presence on the lower portion 7 and on the upper portion 8 of peripheral projections 12 and 13 which are inserted in corresponding cavities of plug 2. These projections, similar to projections 10 and 11 (which they can replace), cooperate in anchoring the packing to plug 2. These projections can also be continuous, ring-shaped, or in sections.

Figure 5:
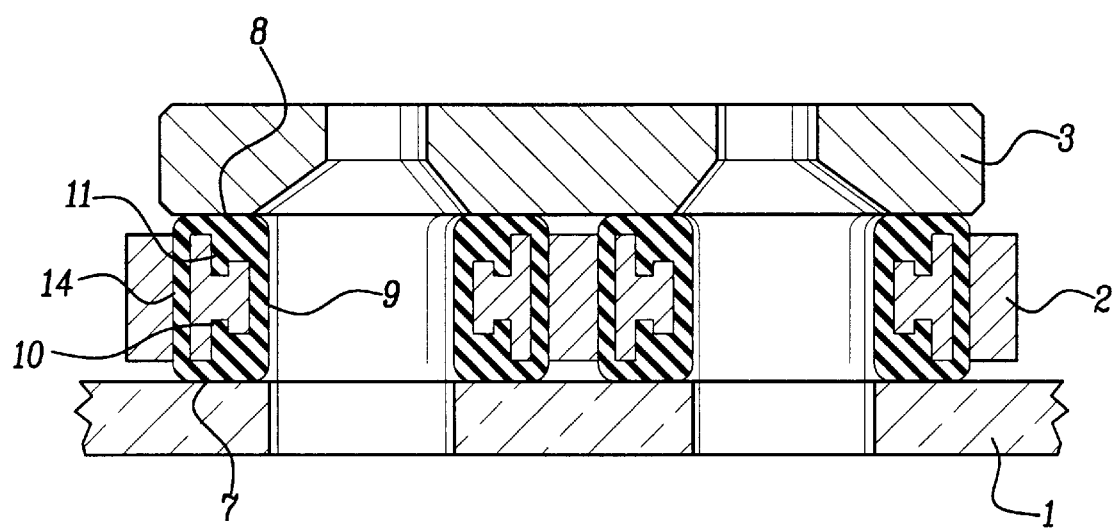
FIG. 5 is a view similar to FIG. 3 except showing a third embodiment of a packing of the instant invention.

In the embodiment illustrated in FIG. 5, peripheral projections 12 and 13 of the embodiment illustrated in FIG. 4 are replaced by portions 14 that extend through the cavities of plug 2, connecting portions 7 and 8 of the packing to each other. It is readily apparent that portions 14 cannot extend continually along the entire periphery of the packing and must be in sections that can be made in any number and any extent. Another embodiment of the portions in sections extending through the plug is shown in cross-section in FIG. 13. Portions 14 can also replace portion 9 instead of being an addition thereto. It is obvious that such an embodiment could not be produced except by the injection procedure of the instant invention.

Figure 6:
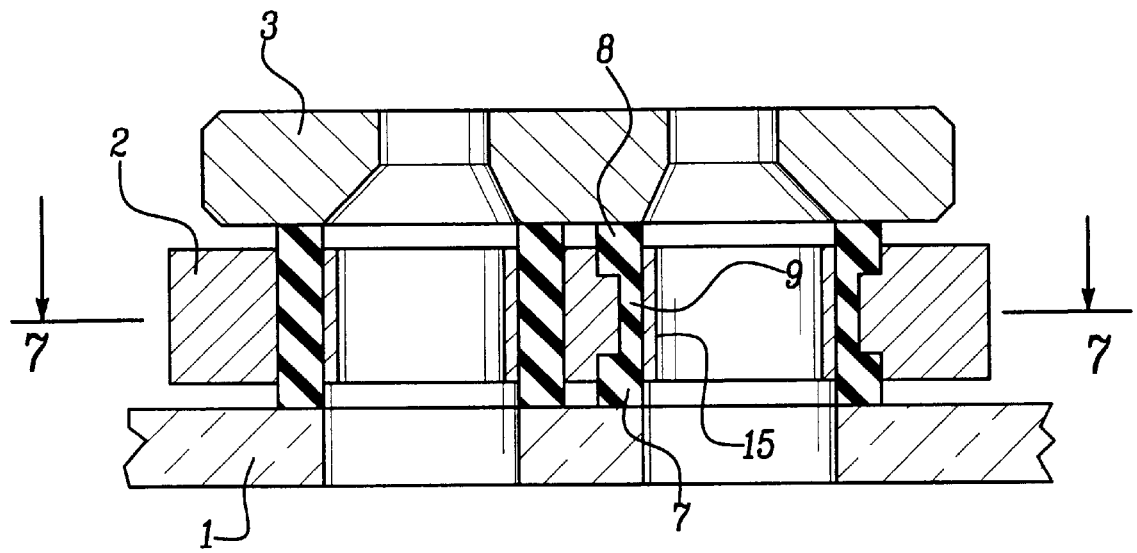
FIG. 6 is a view similar to FIG. 3 except showing a fourth embodiment of a packing of the instant invention.
Figure 7:
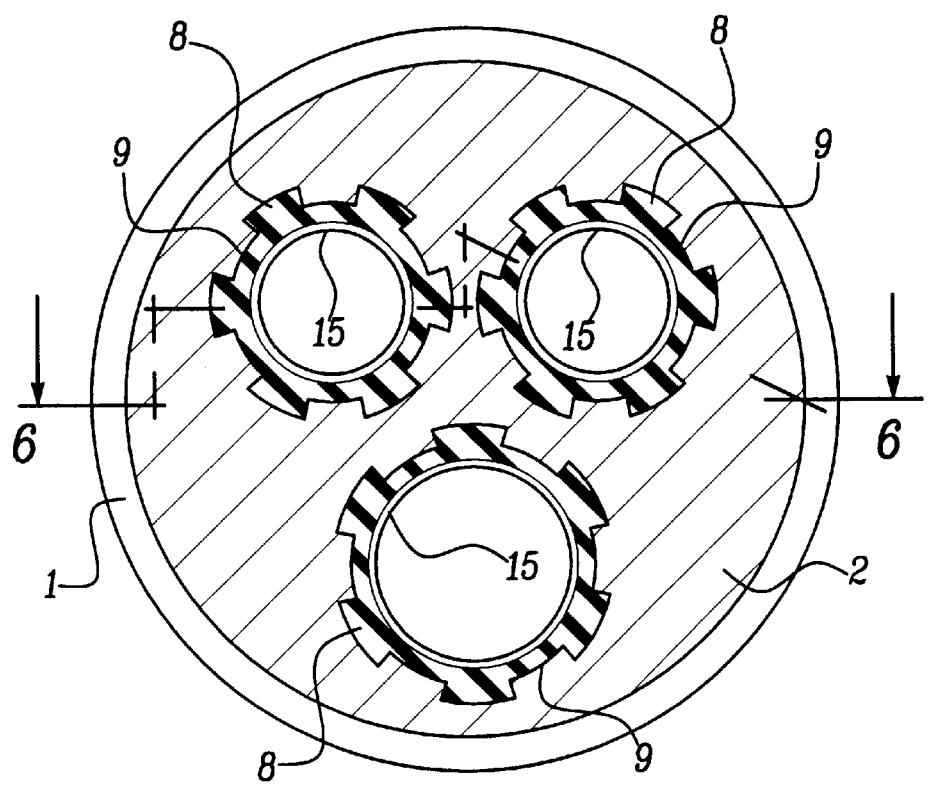
FIG. 7 is a top plan view taken along line VII—VII in FIG. 6.

In the embodiment illustrated in FIGS. 6 and 7 the packing still has inferior portion 7 and superior portion 8 that have a part of their surfaces abutting against plug 2 and a connecting portion 9 that extends axially. However, portions 7 and 8 are also peripherally anchored to plug 2 due to their toothed configuration, as illustrated in FIG. 7. The peripheral teeth of these portions can also be configured in an undercut fashion. Alternatively, a similar embodiment can be provided without the peripheral teeth. In this embodiment a rigid bushing 15 can be inserted inside connecting portion 9 of the packing.

Figure 13:
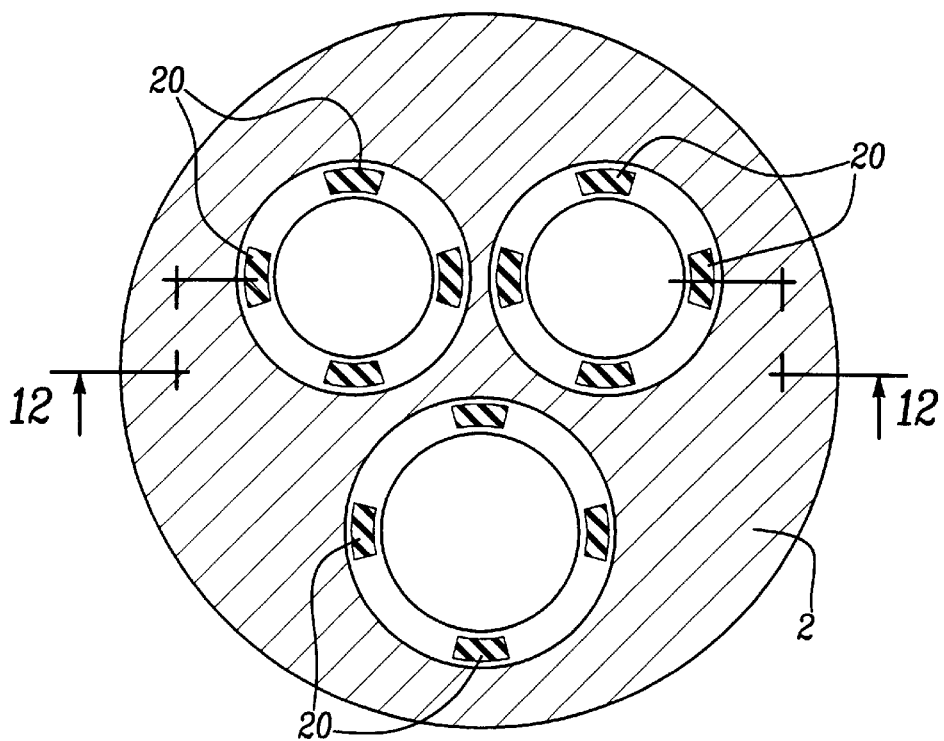
FIG. 13 is a top plan view taken along line XIII—XIII in FIG. 12.

Alternatively, the bushing illustrated in FIG. 6 and labeled 15, instead of being a separate, rigid, inserted bushing, can be a part of plug 2 and in such case connecting portion 9 need not be continuous but can be made in sections and can extend through corresponding openings in plug 2, as described above in conjunction with the embodiment illustrated in FIG. 5 and as substantially illustrated in FIG. 13.

Figure 8:
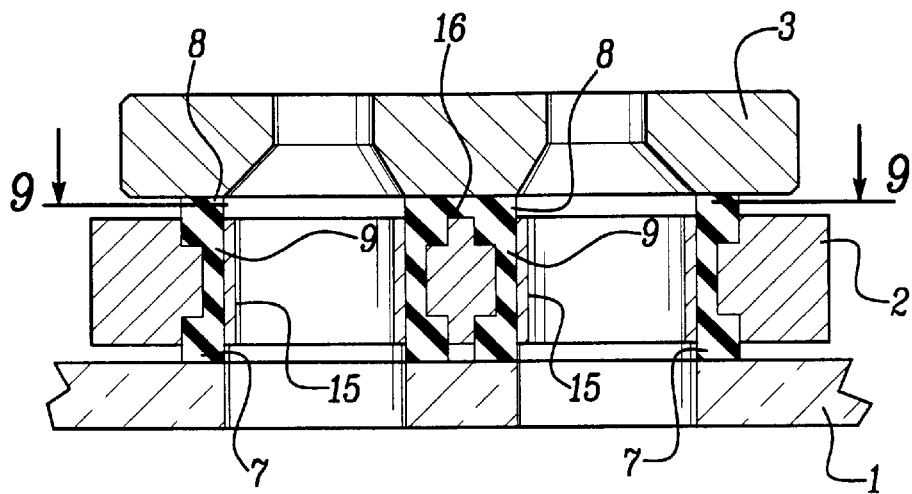
FIG. 8 is a view similar to FIG. 3 except showing a fifth embodiment of a packing of the instant invention.
Figure 9:
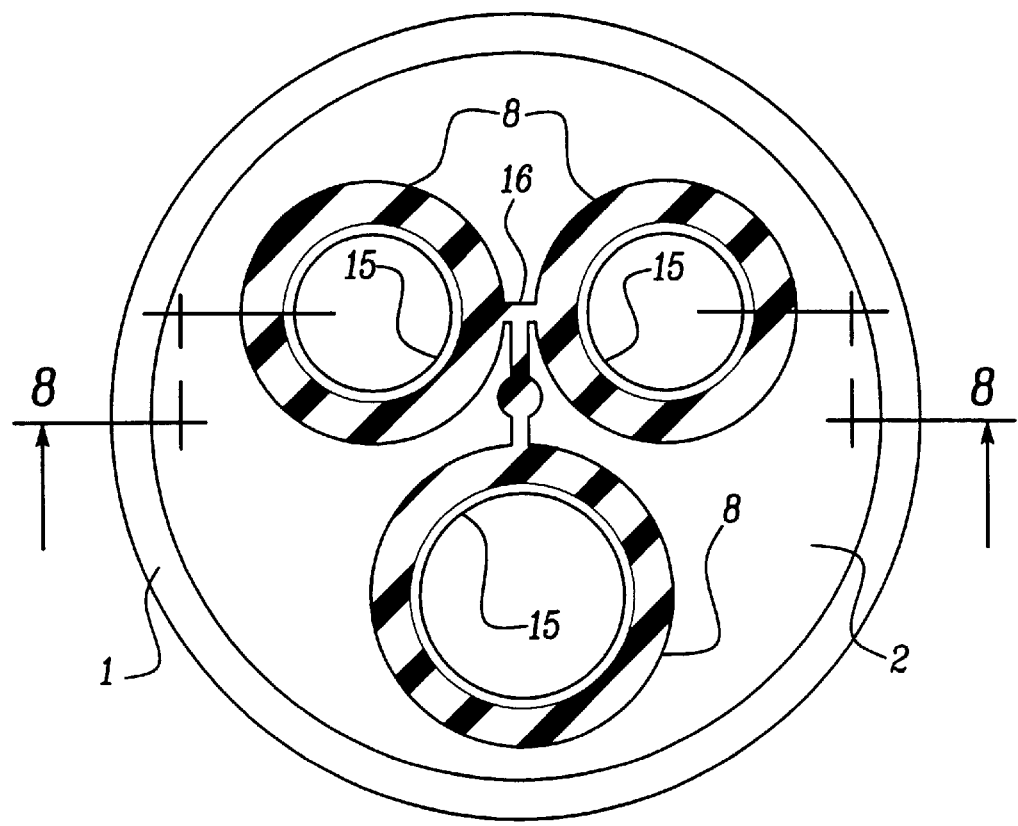
FIG. 9 is a top plan view taken along line IX—IX in FIG. 8.

FIGS. 8 and 9 illustrate how a plurality of packings of the type described in the preceding embodiment (which in this embodiment do not have any peripheral teeth) can be made during the injection procedure, providing for a single injection region 16 that communicates with portions 8 of all or part of the packings of plug 2. It is, however, possible to have several common injection points when expedient by the injection technique.

Figure 10:
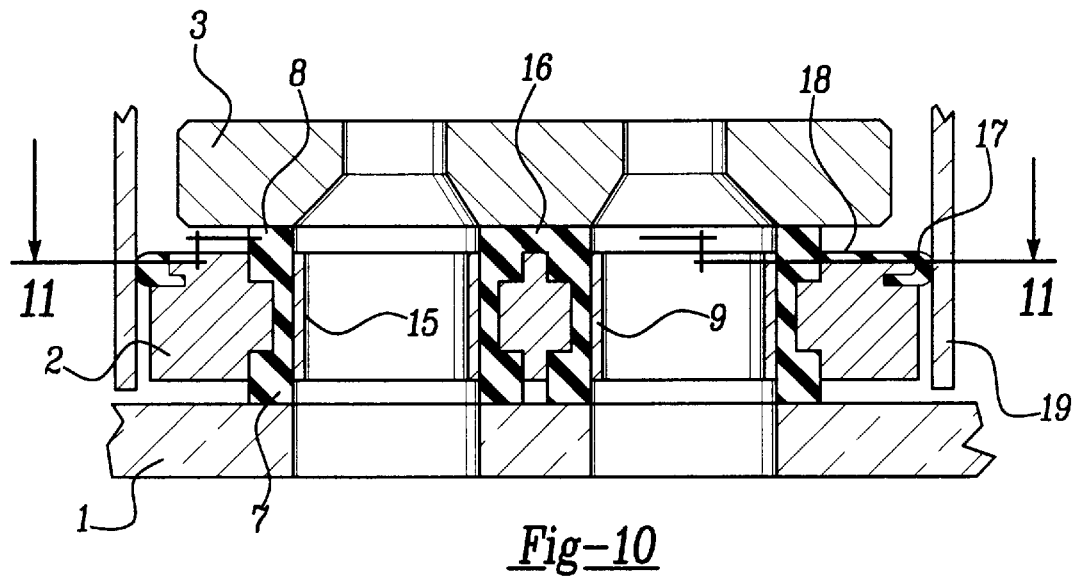
FIG. 10 is a view similar to FIG. 3 except showing a sixth embodiment of a packing of the instant invention, this embodiment being a modification of the fifth embodiment shown in FIGS. 8 and 9.
Figure 11:
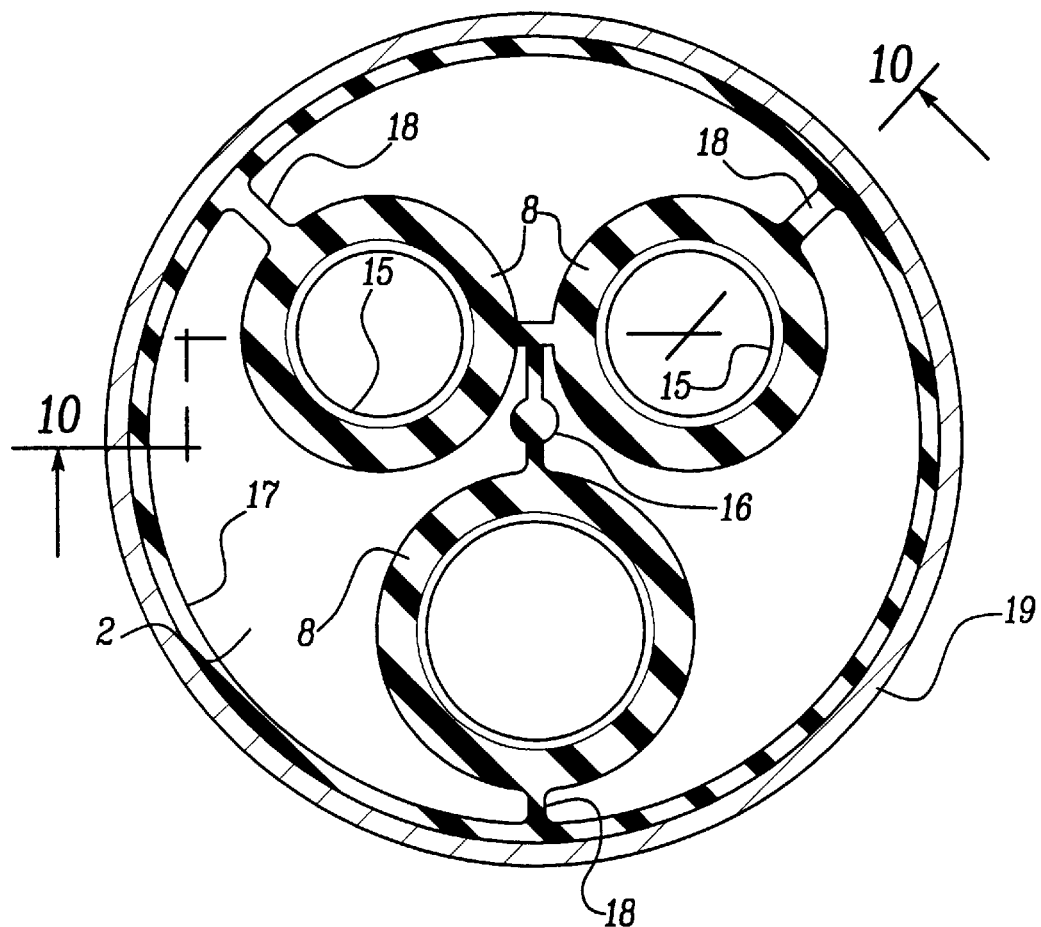
FIG. 11 is a top plan view taken along XI—XI in FIG. 10.

This concept can be further extended, as illustrated in FIGS. 10 and 11, to mold on plug 2, together with the packings described in the preceding embodiment, a peripheral packing 17 that is adapted to seal the opening between plug 2 and wall 19 of the cartridge. For this purpose it is sufficient to provide communication passages 18 between the injection spaces of packings 7, 8 and 9 and a peripheral ring-shaped injection space for packing 17.

Figure 12:
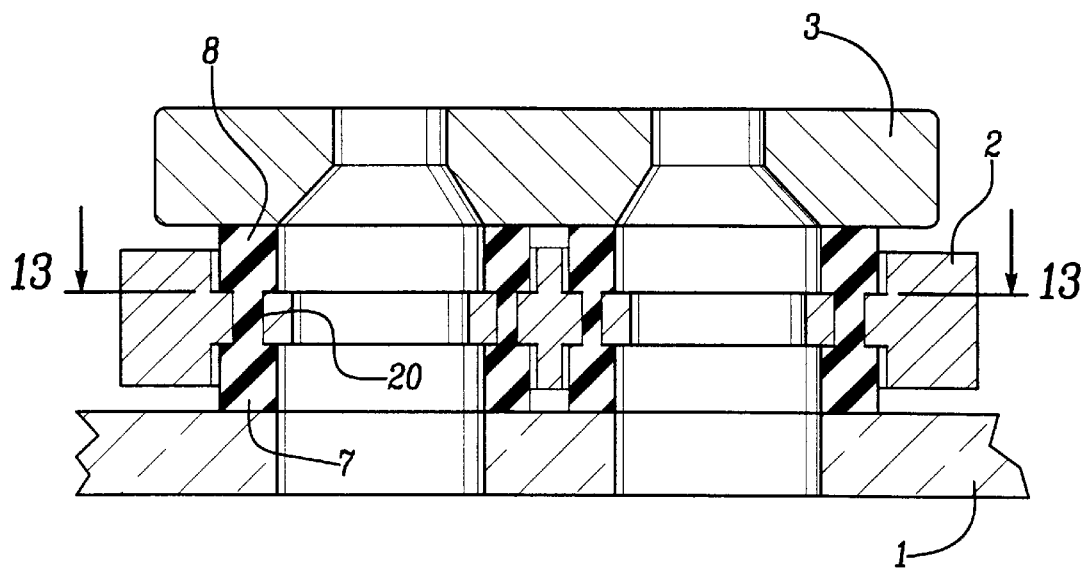
FIG. 12 is a view similar to FIG. 3 except showing a seventh embodiment of a packing of the instant invention.

In the embodiment illustrated in FIGS. 12 and 13 inferior portion 7 and superior portion 8 are connected to each other by connecting portions 20 which, in contrast to connecting portions 9 discussed earlier, are not continuous but are made up of sections and go through corresponding passage openings in plug 2 similarly to the peripheral connecting portions 14 illustrated in FIG. 5. Packings that have this configuration can also only be made by the injection procedure of this invention.

Figure 14:
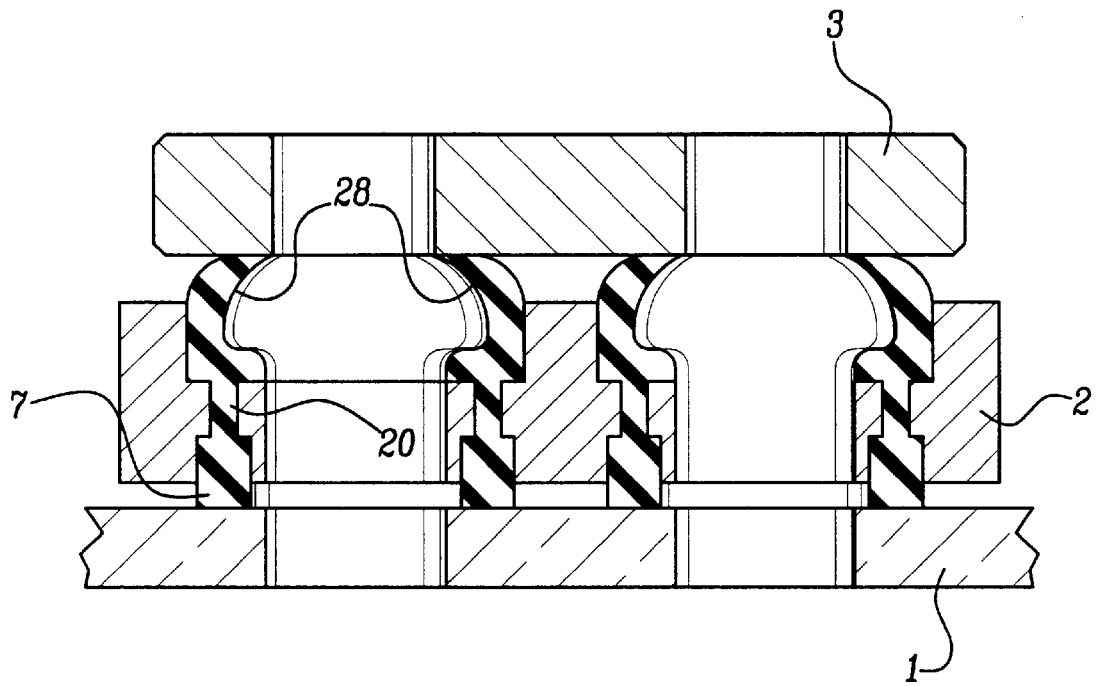
FIG. 14 is a view similar to FIG. 3 except showing an eighth embodiment of a packing of the instant invention.

FIG. 14 illustrates a modification of the embodiment illustrated in FIG. 12. In this case superior portion 38 of the packing is shaped like a lip. Due to this configuration the packing assumes a "hydraulic effect" since its contact pressure with respect to fixed plate 3 is determined not only by the mounting compression but also by the pressure exerted on lip 28 by the water. In this way, the contact pressure increases as water pressure increases, automatically adapting to it so that the mounting compression, which represents the minimum contact pressure of lip 28, can be set at a lower value. It is, of course, to be understood that where considered advisable inferior portion 7 of the packing can also be made in the form of a lip similar to superior portion 28.

Figure 15:
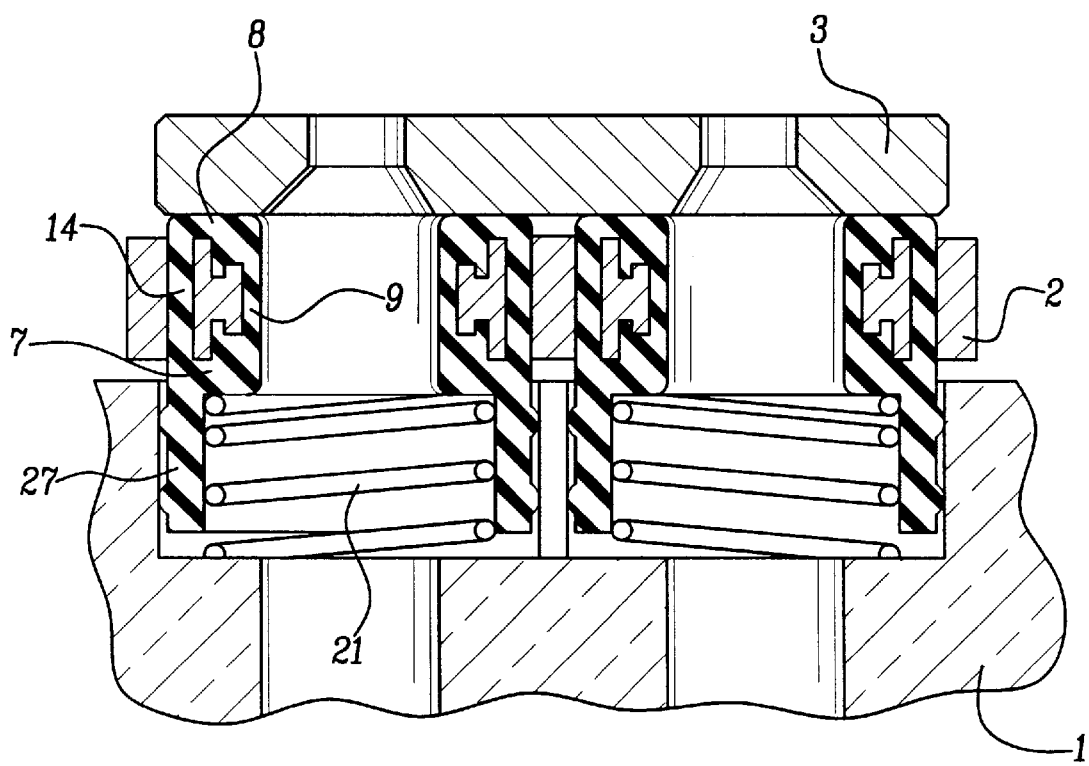
FIG. 15 is a side elevational cross-sectional view of a ninth embodiment of a packing of the instant invention.

FIG. 15 illustrates another embodiment of the invention. Certain conventional cartridges are provided with lower connections that extend into seats formed in the bottom of the faucet body cavity, providing a sealing hold by means of packings applied to the connections and receiving a water thrust that depends on the water pressure and, if applicable, on the pressure of a spring. With the present invention it is possible to make said connections and their packings in a single operation during the injection of the packings of the plug. In the embodiment illustrated in FIG. 15, each of the packings of the plug is basically of the type shown in FIG. 5, but its inferior portion 7 extends peripherally to form a sleeve 27 and rests against the inferior portions 7 of the packings. This embodiment illustrates how the invention can be used advantageously to facilitate the production of certain special cartridges for faucets and make them more economical.

It should be noted that an embodiment similar to the one in FIG. 15 but turned upside down makes it possible to produce connections that extend upwardly from packing 2 of the cartridge and that are adapted to engage in corresponding cavities of fixed plate 3.

Reference has already been made to the fact that the particular resistance of the packings of the plug of a cartridge enable them to function not only in a static fashion, that is to say to establish a seal between immobile operating parts, but also to function in a dynamic fashion, that is to say to establish a seal of the plug with respect to an operationally mobile part such as a stopper. The stability of shape of the packings of the plug of a cartridge makes it possible to give them shapes that have different lengths in various directions, in other words elongated shapes that are different from circular shapes and also shapes that are quite different on the two sides of the plug of the cartridge. These features of the instant invention are illustrated in FIGS. 16 to 19.

Figure 16:
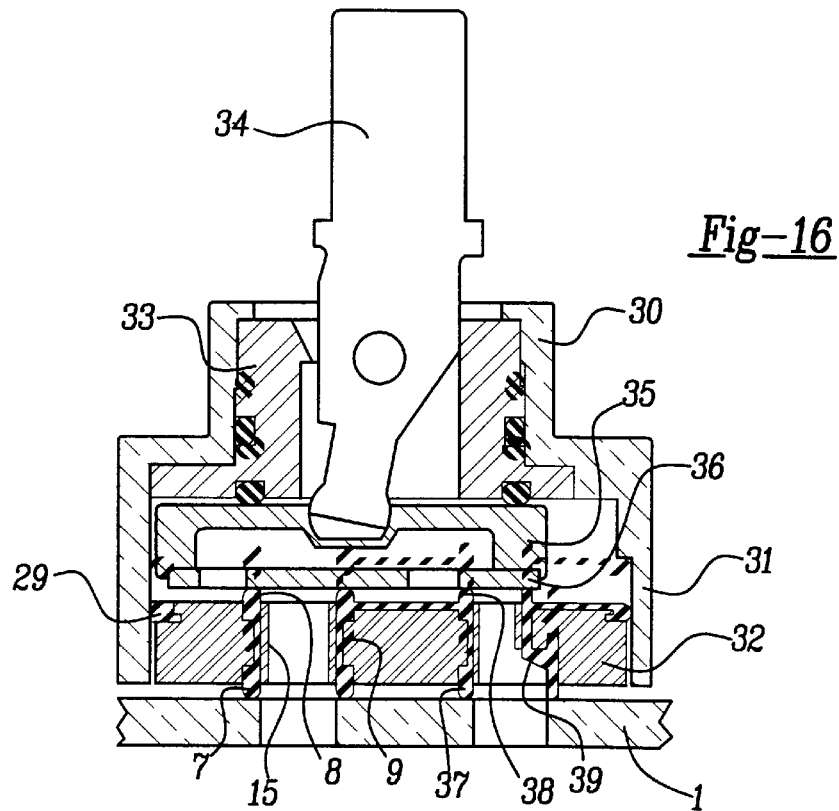
FIG. 16 is a side elevational cross sectional view of a cartridge, with a flat mobile plate in contact with the packing of the instant inventions.
Figure 17:
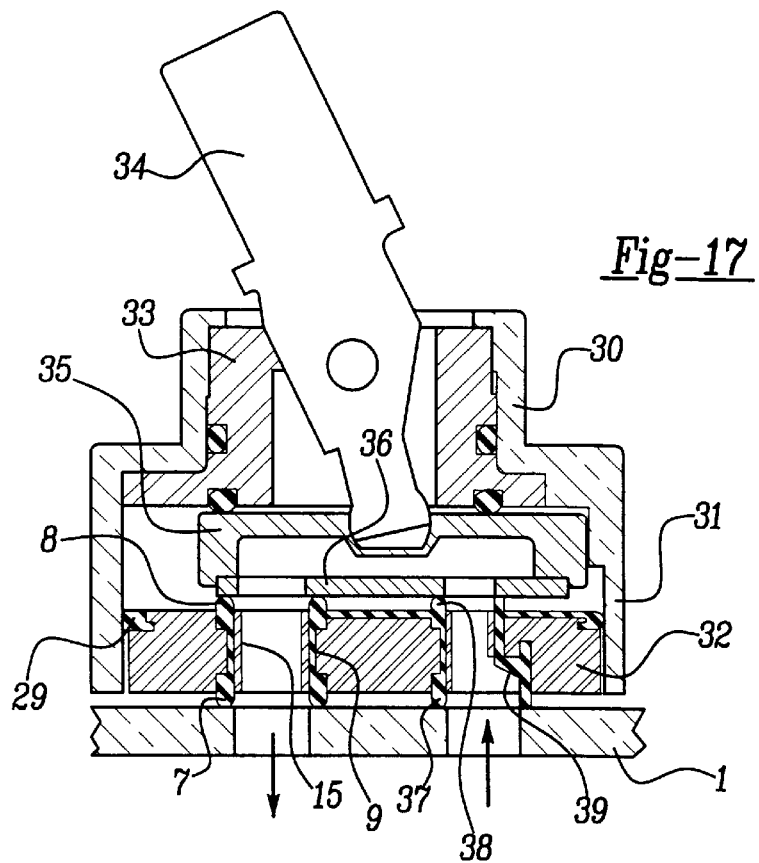
FIG. 17 is a view similar to FIG. 16 except showing the operating handle and flat mobile plate in a different position.
Figure 18:
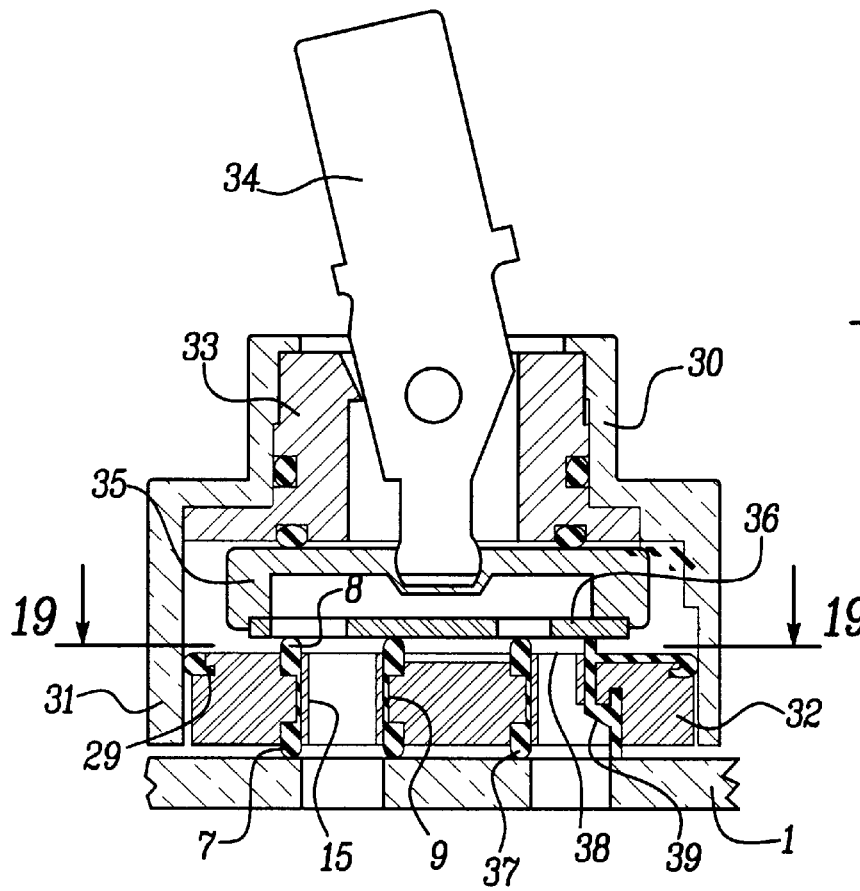
FIG. 18 is a view similar to FIG. 16 except showing the operating handle and flat mobile plate in a different position.

The cartridge for a mixing faucet shown in these figures, particularly in the vertical cross-section in FIGS. 16 to 18 which illustrate it in various operating positions, comprises a shell 30 with a perimeter wall 31 to which is connected a plug 32 with the interposition of a packing 29. In the upper part of shell 30 is rotatably mounted a supporting ring 33 on which is pivoted a lever 34 coupled to a slide 35. This slide has a flat stopper 36 that can be made of, for example, inoxidizable steel. The stopper 36 has passage openings that communicate with each other in the inside space of slide 35. Stopper 36 is intended to cooperate directly with packings formed on plug 32.

Figure 19:
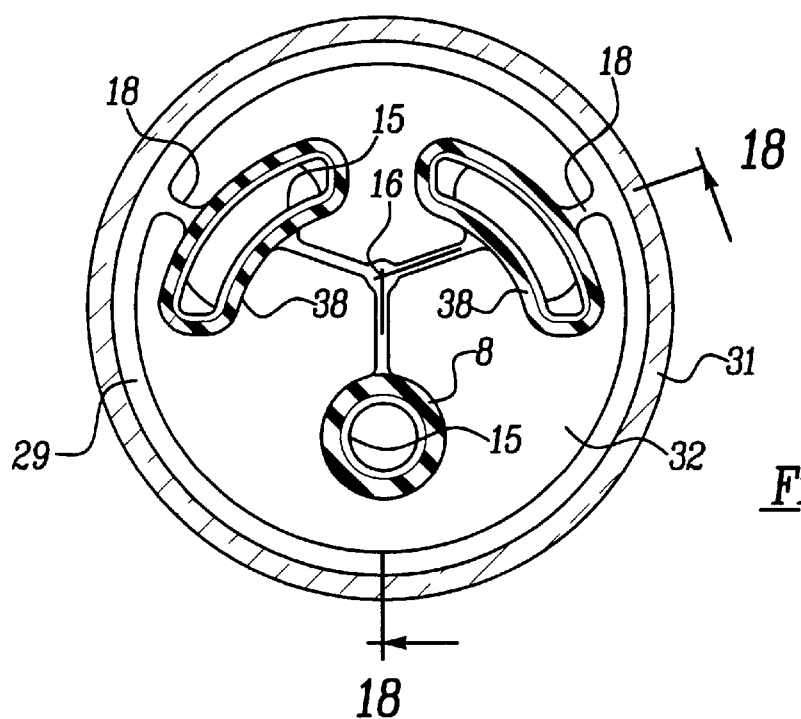
FIG. 19 is a view taken along line XIX—XIX in FIG. 18.

As shown in FIG. 19, superior portion 8 of a packing for an outlet opening (and thus the corresponding inferior portion 7) can be circular, while superior portion 38 of the packings for the inlet openings have, for example, a "banana" shape or the like which permits flow control that is much more accurate than the one attainable with circular inlet openings. Packings having this shape made in the traditional and conventional fashion would be readily broken by stopper 36 when it moves from a position of occlusion (FIG. 16) to a position of complete admission (FIG. 17) passing through intermediate positions (FIG. 18). The effective anchorage of the plug of the packings of this invention, on the other hand, enables packings having this shape to operate properly in contact with the mobile stopper without being dislocated or deformed.

Furthermore, since the inferior portions 37 of the packings for the inlet openings need not have a shape different from a circular shape, they can have a circular shape and can be connected to banana shaped superior portions 38 through connecting walls 39. All the packings and packing portions 7, 8, 37, 38, 39 and 29 of plug 2, or part of them, can be made collectively from a single injection point 16 (or from several common injection points) and through ducts 18, as discussed earlier in connection with FIGS. 8–11. Finally, reinforcing bushings 15 can be introduced into packings 7–9 and 37–39.

A cartridge such as the one shown in FIGS. 16–19 offers performance that substantially corresponds to those of a similar cartridge employing a pair of plates made of hard material, one fixed and one mobile, and is considerably less expensive and less bulky.

Other modifications and variations of the present invention are possible in light of the above teachings. It is, therefore, to be understood that changes may be made in the particular embodiments of the invention described which are within the full intended scope of the invention as defined by the appended claims.

What is claimed is:

1. Plug with sealing packing for a water faucet cartridge comprising the sealing packing being in one piece on both sides of the plug, wherein both the portion of the packing that is on one side of the plug and the portion of the packing that is on the other side of the plug have at least a portion of their surface in contact with the plug and are connected to each other by at least one connecting portion.

2. Plug with packing of claim 1 wherein said connecting portion extending between the portions of packings that are on the two sides of the plug is connected to them along their internal periphery.

3. Plug with packing of claim 2 wherein said connecting portion is continuous.

4. Plug with packing of claim 2 wherein said connecting portion is comprised of sections.

5. Plug with packing of claim 1 wherein said connecting portion is linked to the portions of the packings that are on the two sides of the plug in regions different from their internal periphery and extends in sections through openings in the plug.

6. Plug with packing of claim 1 wherein at least one of said packing portions that are on the two sides of the plug has projections which are adapted to be inserted in corresponding openings in the plug.

7. Plug with packing of claim 1 wherein at least one of said packing portions that are on the two sides of the plug has peripheral teeth.

8. Plug with packing of claim 1 wherein various packings of the plug have connecting sections that permit their collective injection from one or several common injection points.

9. Plug with packing of claim 8 comprising a peripheral ring-shaped packing, which has at least one connecting section to at least one other packing of the plug so as to be injected collectively with it from one or several common injection points.

10. Plug with packings of claim 1 wherein at least one packing portion on at least one side of the plug has the shape of a lid.

11. Plug with packing of claim 1 wherein the packing portion on the side of the plug facing the bottom of the faucet body cavity forms a protruding connection with retaining projections adapted to be inserted in a corresponding seat of the bottom of the faucet body cavity.

12. Plug with packing of claim 11 wherein said protruding connection is arranged to receive a spring.

13. Plug with packing of claim 1 wherein the packing portion on the side of the plug facing toward the inside of the cartridge forms a protruding connection with retaining projections adapted to be inserted in a corresponding seat of a member that is a part of the flow control means.

14. Plug with packing of claim 1 wherein said packing portion that is at least on one side of the plug has a substantially circular shape.

15. Plug with packing of claim 1 wherein said packing portion that is on one side of the plug has a shape that has different extension in various directions.

16. Plug with packing of claim 1 wherein said packing portion that is at least on one side of the plug has a shape that is substantially different from the shape of the corresponding packing portion that is on the other side of the plug, said packing portions being connected to each other by connecting portions that extend in a non-axial direction.

* * * * *